US012583017B2

(12) United States Patent
Kenjo et al.

(10) Patent No.: US 12,583,017 B2
(45) Date of Patent: Mar. 24, 2026

(54) CLASSIFICATION DEVICE AND SHOT PROCESSING DEVICE

(71) Applicant: SINTOKOGIO, LTD., Nagoya (JP)

(72) Inventors: Isaku Kenjo, Nagoya (JP); Takehiro Okamoto, Nagoya (JP); Yusuke Yamada, Nagoya (JP); Hiroaki Suzuki, Nagoya (JP); Shuichi Kamori, Nagoya (JP); Kyouji Yamashita, Nagoya (JP)

(73) Assignee: SINTOKOGIO, LTD., Nagoya (JP)

( * ) Notice: Subject to any disclaimer, the term of this patent is extended or adjusted under 35 U.S.C. 154(b) by 51 days.

(21) Appl. No.: 18/199,393

(22) Filed: May 19, 2023

(65) Prior Publication Data

US 2023/0405637 A1 Dec. 21, 2023

(30) Foreign Application Priority Data

Jun. 17, 2022 (JP) ................................ 2022-098059

(51) Int. Cl.
*B07B 7/01* (2006.01)
*B24C 9/00* (2006.01)

(52) U.S. Cl.
CPC ................ *B07B 7/01* (2013.01); *B24C 9/006* (2013.01)

(58) Field of Classification Search
CPC ........... B07B 1/01; B07B 11/02; B07B 11/04; B24C 9/006; B24C 3/00
USPC ......................................... 209/138, 142, 154
See application file for complete search history.

(56) References Cited

U.S. PATENT DOCUMENTS 2,696,910 A * 12/1954 Ljungdell ............... B24C 9/006 209/139.1
4,991,721 A * 2/1991 Misra ...................... B07B 11/04 209/546
5,411,142 A * 5/1995 Abbott .................... B07B 11/04 209/139.1
5,798,917 A * 8/1998 Werbrouck ........... G05B 11/32 241/34
8,491,685 B2 * 7/2013 Witter ................ B01D 46/0093 55/467

FOREIGN PATENT DOCUMENTS

JP 2008-018476 A 1/2008
WO WO-2021001897 A1 * 1/2021 ............. G06Q 10/04

OTHER PUBLICATIONS

Kitamura; Tomohiro, "Learning Model Generation Method, Computer Program, Learning Model, Control Device, and Control Method" (English Translation), Jan. 7, 2021, worldwide.espacenet.com (Year: 2021).*

* cited by examiner

*Primary Examiner* — Molly K Devine
(74) *Attorney, Agent, or Firm* — Faegre Drinker Biddle & Reath LLP

(57) ABSTRACT

A classification device includes: a sorting mechanism that sorts a group of powder particles using an airflow; a dust collector that generates the airflow; a measuring instrument that measures a measurement value related to a speed of the airflow; and a control device that performs wind speed control that controls the speed of the airflow so that the measurement value is maintained within a control range.

20 Claims, 8 Drawing Sheets

CLASSIFICATION DEVICE AND SHOT PROCESSING DEVICE

CROSS-REFERENCE TO RELATED APPLICATION

This application is based on Japanese Patent Application No. 2022-98059 filed with Japan Patent Office on Jun. 17, 2022 and claims the benefit of priority thereto. The entire contents of the Japanese patent application are incorporated herein by reference.

TECHNICAL FIELD

The present disclosure relates to a classification device and a shot processing device.

BACKGROUND

A classification device that classifies powder particles according to particle diameters is known. For example, Japanese Patent Application Publication No. 2008-18476 discloses a winnowing type classification device that separates shot media projected onto a workpiece into relatively large shot media and relatively small shot media by airflow of a dust collector or the like.

SUMMARY

In a winnowing classification device such as that described in Japanese Patent Application Publication No. 2008-18476, the wind speed may change as the operating time elapses. For example, clogging of a filter of a dust collector may reduce the wind speed. When the clogging of the filter is eliminated, the wind speed may increase. Such a case may lead to reduced accuracy of the classification.

The present disclosure describes a classification device and a shot processing device capable of suppressing reductions in classification accuracy.

A classification device according to one aspect of the present disclosure includes a sorting mechanism, a dust collector, a measuring instrument, and a control device. The sorting mechanism sorts a group of powder particles using an airflow. The dust collector generates the airflow. The measuring instrument measures a measurement value related to a speed of the airflow. The control device performs wind speed control that controls the speed of the airflow so that the measurement value is maintained within a control range.

According to each aspect and each embodiment of the present disclosure, it is possible to suppress reductions in classification accuracy.

DETAILED DESCRIPTION

Figure 1:
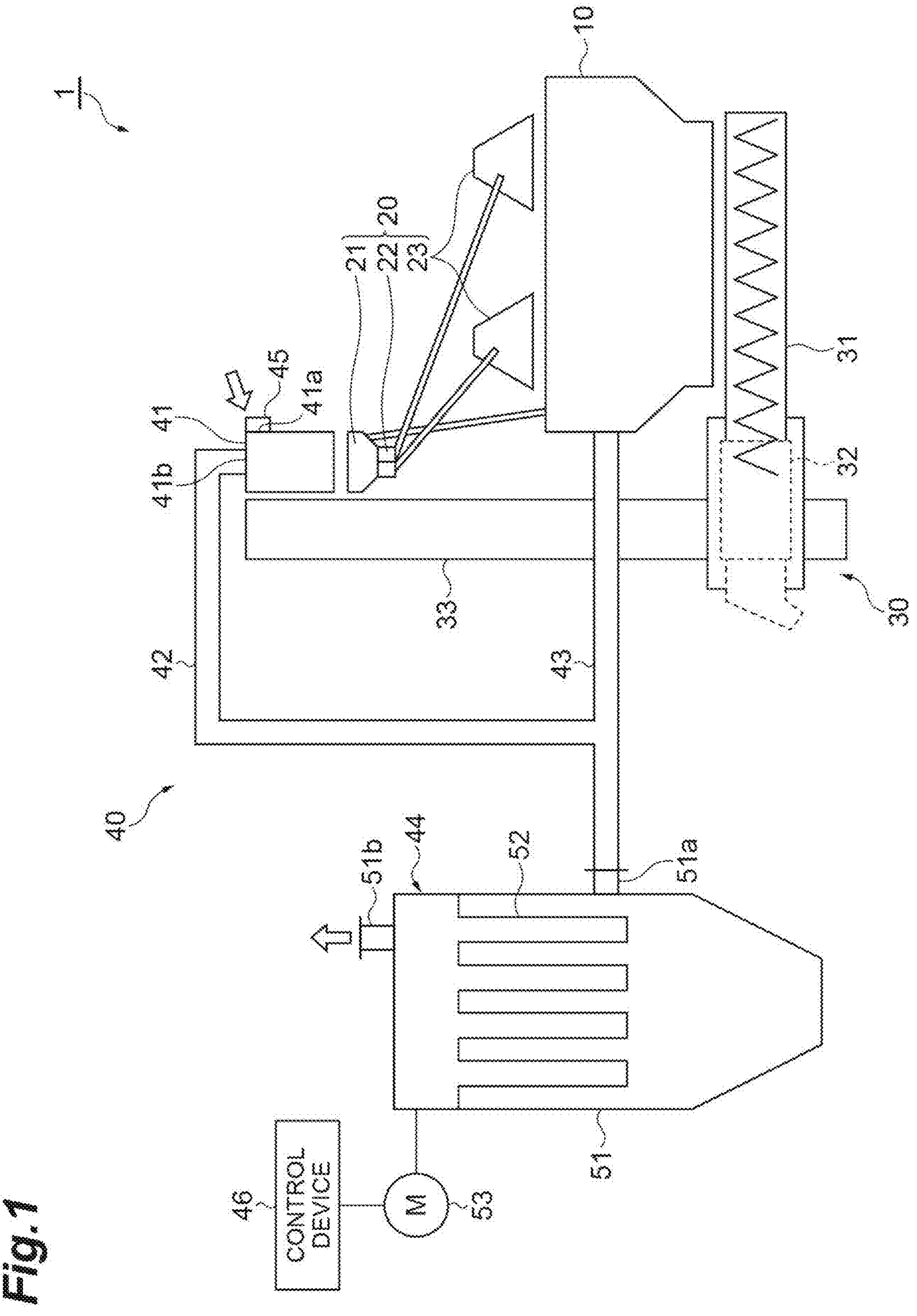
FIG. 1 is a configuration diagram schematically showing a shot processing device including a classification device according to an embodiment.

Outline of Embodiments of the Present Disclosure

First, an outline of embodiments of the present disclosure will be described.

(Clause 1)

A classification device according to one aspect of the present disclosure includes a sorting mechanism, a dust collector, a measuring instrument, and a control device. The sorting mechanism sorts a group of powder particles using an airflow. The dust collector generates the airflow. The measuring instrument measures a measurement value related to a speed of the airflow. The control device performs wind speed control that controls the speed of the airflow so that the measurement value is maintained within a control range.

In the classification device, the group of powder particles is sorted using the airflow generated by the dust collector, and the wind speed control is performed so that the measurement value related to the speed of the airflow is maintained within the control range. Since the fluctuation of the speed (wind speed) of the airflow is suppressed by the measurement value being maintained within the control range, it is possible to suppress reductions in the classification accuracy.

(Clause 2)

In the classification device according to clause 1, the dust collector may include a fan motor capable of adjusting a flow rate of the airflow. The control device may perform the wind speed control by changing a rotation speed of the fan motor. When the rotation speed of the fan motor increases, the wind speed of the airflow increases, and when the rotation speed of the fan motor decreases, the wind speed of the airflow decreases. Therefore, the wind speed control can be realized by changing the rotation speed of the fan motor.

(Clause 3)

The classification device according to clause 1 or 2 may further include: a conduit that is provided between the sorting mechanism and the dust collector and through which the airflow passes; and a flow rate adjuster that is provided in the conduit and is capable of adjusting an opening degree. The control device may perform the wind speed control by changing the opening degree. When the opening degree of the flow rate adjuster increases, the wind speed of the air flow increases, and when the opening degree of the flow rate adjuster decreases, the wind speed of the air flow decreases. Therefore, the wind speed control can be realized by changing the opening degree of the flow rate adjuster.

(Clause 4)

The classification device according to any one of clauses 1 to 3 may further include an inlet through which outside air is introduced into the sorting mechanism. The measuring instrument may be provided in the inlet. Since the powder particles are mixed in the airflow in the sorting mechanism, when the measuring instrument is provided inside the sorting mechanism, there is a concern that the measuring instrument may be broken by the powder particles. On the other hand, since no powder particle is contained in the outside air, it is possible to avoid the failure of the measuring instrument due to the powder particles.

(Clause 5)

In the classification device according to any one of clauses 1 to 4, the dust collector may include an exhaust port through which clean air is exhausted to outside of the classification device. The measuring instrument may be provided in the exhaust port. In the dust collector, clean air from which powder particles (dust) have been removed is exhausted from the exhaust port. Therefore, since no powder particle is contained in the clean air, it is possible to avoid the failure of the measuring instrument due to the powder particles.

(Clause 6)

In the classification device according to any one of clauses 1 to 5, the control device may perform the wind speed control in response to a state in which the measurement value is out of the control range continuing for a detection time. Since the speed of the airflow is likely to fluctuate, the measurement value may temporarily fall out of the control range. In such a case, if the wind speed control is performed, the measurement value may not be stably maintained within the control range. On the other hand, in the above configuration, since the wind speed control is performed when the measurement value is continuously out of the control range, the measurement value can be stably maintained within the control range. As a result, it is possible to further suppress reductions in classification accuracy.

(Clause 7)

In the classification device according to any one of clauses 1 to 6, the control device may stop the wind speed control until a waiting time elapses from a time at which the wind speed control ends. It takes a certain amount of time until the wind speed of the airflow becomes stable after the wind speed control is performed. Therefore, immediately after the wind speed control is performed, the measurement value may still remain outside the control range. In such a case, if the wind speed control is performed, the measurement value may not be stably maintained within the control range. On the other hand, in the above-described configuration, since the wind speed control can be stopped until the wind speed of the airflow becomes stable from the time at which the wind speed control ends, it is possible to stably maintain the measurement value within the control range. As a result, it is possible to further suppress reductions in classification accuracy.

(Clause 8)

In the classification device according to any one of clauses 1 to 7, the control device may perform the wind speed control in a stepwise manner over an operation time. In this case, since the speed of the airflow gradually changes, it is possible to suppress the turbulence of the airflow. As a result, it is possible to further suppress reductions in classification accuracy.

(Clause 9)

A shot processing device according to another aspect of the present disclosure includes: the classification device according to any one of clauses 1 to 8; a projection device that performs shot processing by projecting shot media onto a workpiece; and a collection device that collects a group of powder particles generated by the shot processing and supplies the group of powder particles to the classification device. The classification device sorts reusable shot media from the group of powder particles and supplies the shot media to the projection device.

In the shot processing device, the shot processing is performed by projecting shot media onto a workpiece, a group of powder particles generated by the shot processing is supplied to the classification device, and reusable shot media are sorted from the group of powder particles and are supplied to the projection device. Since the classification device capable of suppressing reductions in classification accuracy is used, the shot media which do not contribute to the shot processing can be accurately excluded from the group of powder particles. As a result, the efficiency of the shot processing can be improved.

Exemplary Embodiments of the Present Disclosure

Hereinafter, embodiments of the present disclosure will be described in detail with reference to the drawings. In the description of the drawings, the same elements are denoted by the same reference numerals, and redundant description is omitted.

A shot processing device including a classification device according to an embodiment will be described with reference to FIG. 1. FIG. 1 is a configuration diagram schematically showing a shot processing device including a classification device according to an embodiment. A shot processing device 1 shown in FIG. 1 is a device that performs shot processing on a workpiece. Examples of the shot processing include shot blasting and shot peening. The shot processing device 1 performs, for example, removal (sand removal) of foundry sand (mainly, silica sand and carbonized additives) attached to a cast component after casting, and polishing and grinding-cleaning of a casting surface by the shot processing. The shot processing device 1 includes a cabinet 10, a projection device 20, a collection device 30, and a classification device 40.

The cabinet 10 is a housing capable of housing a workpiece. A processing chamber for performing shot processing on a workpiece is formed inside the cabinet 10.

The projection device 20 is a device that performs shot processing by projecting shot media onto a workpiece. The projection type of the projection device 20 may be an air type or an impeller type (centrifugal type). Examples of the air type include a gravity type, a suction type, a direct pressure type (pressurization type), and a blower type. In the present embodiment, an impeller type will be described. Examples of shot media include steel shot and steel grit. The type of shot media can be appropriately selected according to the shot processing. The projection device 20 is provided above the cabinet 10. The projection device 20 includes a shot media tank 21, a gate 22, and an impeller 23.

The shot media tank 21 stores shot media. The gate 22 is provided in a lower portion of the shot media tank 21 and is a member for adjusting an area of an opening portion in a path from the shot media tank 21 toward the impeller 23. The gate 22 supplies a fixed amount of shot media to the impeller 23. The impeller 23 is configured to project the shot media by using centrifugal force. The impeller 23 is rotated at high speed by a driving device (not shown) such as a motor. The shot media supplied on a blade (not shown) of the impeller 23 are projected by a centrifugal force generated with the rotation.

The collection device 30 is a device that collects a group of powder particles generated by the shot processing. The group of powder particles includes the shot media used in the shot processing, the cutting powder of the workpiece generated by the shot processing, and the like. The collection device 30 supplies the collected group of powder particles to the classification device 40. The collection device 30 includes a screw conveyor 31, a rotary screen 32, and a bucket elevator 33.

The screw conveyor 31 is a device that conveys the group of powder particles generated by the shot processing. The screw conveyor 31 is provided below the cabinet 10 and extends horizontally. The screw conveyor 31 receives the group of powder particles generated by the shot processing from the cabinet 10 and conveys the group of powder particles toward the bucket elevator 33. The screw conveyor 31 includes a shaft and blades spirally provided on an outer peripheral surface of the shaft. By the rotation of the shaft, the group of powder particles is conveyed by the blades.

The rotary screen 32 is a rotary sieve. The rotary screen 32 is provided at one end of the shaft of the screw conveyor 31, and removes foreign matter larger than the shot medium from the group of powder particles conveyed by the screw conveyor 31. The rotary screen 32 includes a cylindrical net-like body. The meshes of the net-like body have a diameter greater than the diameter of the shot media.

The bucket elevator 33 conveys the group of powder particles from which the foreign matter has been removed above the cabinet 10. The bucket elevator 33 is provided in parallel with the cabinet 10 and circulates a plurality of buckets. Each bucket scoops up the group of powder particles that has passed through the rotary screen 32, conveys the group of powder particles above the cabinet 10, and supplies the group of powder particles to the classification device 40.

The classification device 40 is a device that sorts reusable shot media from the group of powder particles supplied from the collection device 30. The classification device 40 is provided above the projection device 20 and supplies reusable shot media to the projection device 20. The classification device 40 includes a sorting mechanism 41, a conduit 42, a conduit 43, a dust collector 44, a measuring instrument 45, and a control device 46.

Figure 2:
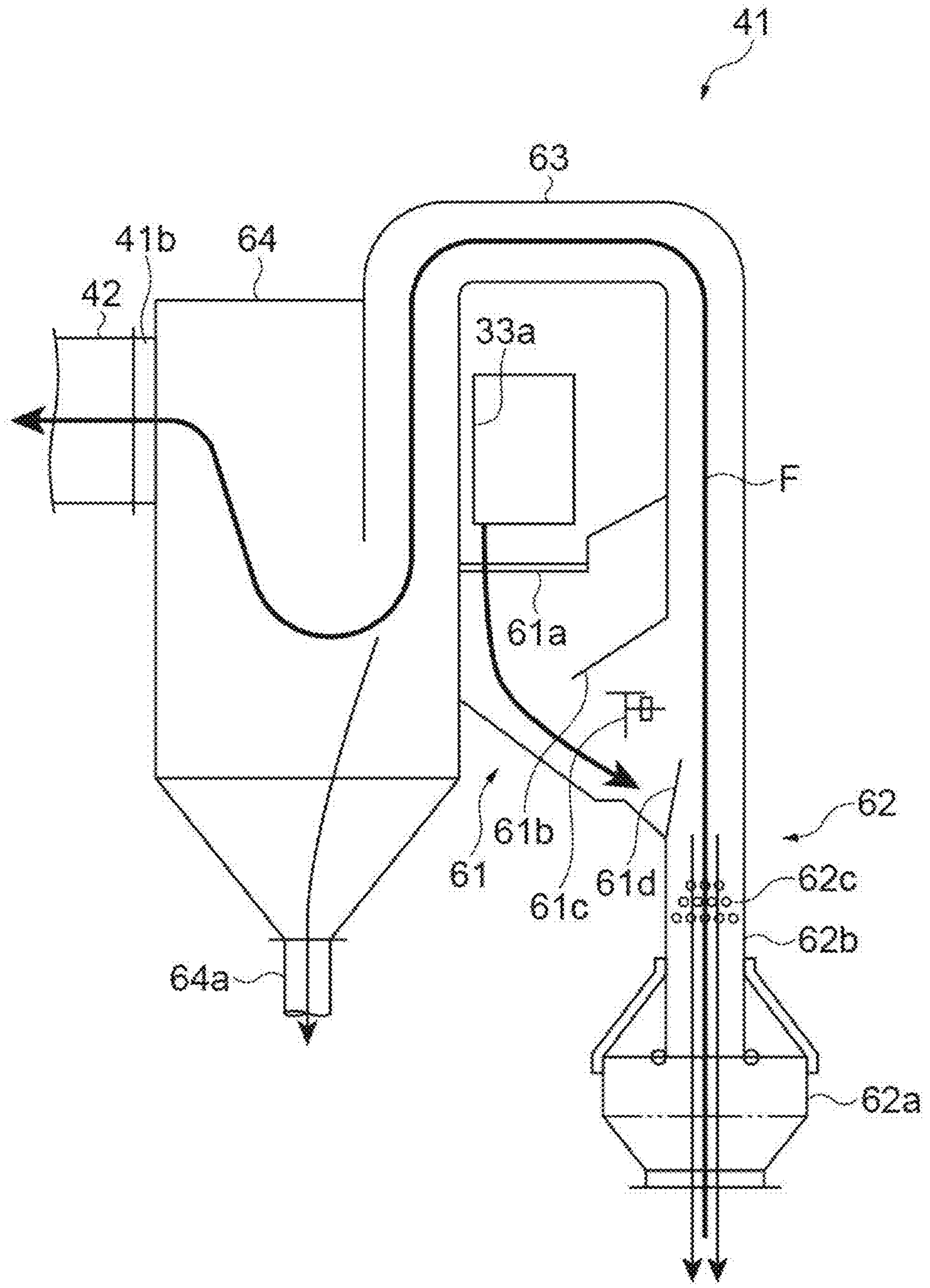
FIG. 2 is a diagram schematically showing an example of the sorting mechanism shown in FIG. 1.

The sorting mechanism 41 is a mechanism that sorts the group of powder particles using airflow F (see FIG. 2). Specifically, the sorting mechanism 41 separates the group of powder particles into reusable shot media and dust which is particles other than the reusable shot media. Dust is a general term for cutting powder of the workpiece generated by the shot processing, shot media having a size that cannot be reused, and the like. A detailed configuration of the sorting mechanism 41 will be described later. The sorting mechanism 41 includes an inlet 41*a* and an outlet 41*b*. The inlet 41*a* is an opening through which outside air is introduced into the sorting mechanism 41. The outlet 41*b* is an opening through which airflow containing dust is discharged from the sorting mechanism 41.

The conduit 42 is provided between the sorting mechanism 41 and the dust collector 44, and couples the sorting mechanism 41 and the dust collector 44 so that airflow can pass therebetween. One end of the conduit 42 is connected to the outlet 41*b* of the sorting mechanism 41, and the other end of the conduit 42 is connected to the dust collector 44. The conduit 43 couples the cabinet 10 and the dust collector 44. One end of the conduit 43 is connected to the side wall of the cabinet 10, and the other end of the conduit 43 joins the conduit 42 to be connected to the dust collector 44.

The dust collector 44 is a device that collects dust. By sucking the conduit 42, the dust collector 44 generates an airflow F flowing from the inlet 41*a* of the sorting mechanism 41 toward the dust collector 44 through the internal space of the sorting mechanism 41 and the conduit 42 in order. The dust collector 44 includes a housing 51, a filter 52, and a fan motor 53. The housing 51 houses the filter 52, a fan (not shown), the fan motor 53, and an inverter (not shown) that drives the fan motor 53. In FIG. 1, for convenience of explanation, the fan motor 53 is shown outside the housing 51.

The housing 51 includes an intake port 51*a* and an exhaust port 51*b*. The other end of the conduit 42 is connected to the intake port 51*a*. The exhaust port 51*b* is an opening for exhausting clean air to the outside of the classification device 40 (housing 51). The filter 52 is a member for capturing the dust sucked by the dust collector 44. The fan motor 53 generates a suction force by rotationally driving the fan. The flow rate of the airflow F may vary depending on the rotation speed of the fan motor 53. That is, the fan motor 53 is configured to be able to adjust the flow rate of the airflow F.

By the operation of the dust collector 44, powder particles (reusable shot media) having a heavy mass falls downward inside the sorting mechanism 41. On the other hand, powder particles (dust) having a light mass are collected by the dust collector 44 through the conduit 42. Further, dust generated in the cabinet 10 is collected by the dust collector 44 through the conduit 43. The dust sucked by the dust collector 44 is captured by using the filter 52. Clean air obtained by removing dust from the airflow containing the dust is exhausted from the exhaust port 51*b* to the outside of the housing 51.

The measuring instrument 45 is an instrument that measures a measurement value related to the speed (wind speed) of the airflow F. The measuring instrument 45 is, for example, an anemometer. Examples of types of anemometers include a thermal type (anemomaster), an impeller type (vane), an ultrasonic type, and a pitot tube type. The measuring instrument 45 may be a dynamic pressure measuring instrument or a flap-type measuring instrument. In the present embodiment, the measuring instrument 45 is provided in the inlet 41*a* of the sorting mechanism 41. Specifically, the measuring instrument 45 is provided outside the sorting mechanism 41 and measures the wind speed of the outside air flowing into the sorting mechanism 41 from the inlet 41*a*. The wind speed of the outside air flowing into the sorting mechanism 41 is substantially the same as the wind speed of the airflow F. The measuring instrument 45 transmits the measurement value to the control device 46.

The control device 46 is a device (controller) that performs wind speed control for controlling the speed (wind speed) of the airflow. The control device 46 is configured as, for example, a computer including a processor such as a central processing unit (CPU), memories such as a random access memory (RAM) and a read only memory (ROM), and a communication device such as a network card. The control device 46 may be configured as a programmable logic controller (PLC) or may be configured by a logic circuit using a relay circuit, a regulator, and the like. The control device 46 performs the wind speed control so that the measurement value measured by the measuring instrument 45 is maintained within a control range R (see FIG. 4). In the present embodiment, the control device 46 performs the wind speed control by changing the rotation speed of the fan motor 53. A method of controlling the wind speed will be described later.

Next, an example of the sorting mechanism 41 will be described with reference to FIG. 2. FIG. 2 is a diagram schematically showing an example of the sorting mechanism shown in FIG. 1. The sorting mechanism 41 shown in FIG. 2 is a vertical facing airflow type separator, and includes a supply portion 61, a sorting portion 62, a connection pipe 63, and a chamber 64.

The supply portion 61 is a portion that defines a supply path for supplying the group of powder particles supplied from the bucket elevator 33 to the sorting portion 62. The supply portion 61 includes a grate 61*a*, a gate 61*b*, a deflection plate 61*c*, and a dispersion steel plate 61*d*. The grate 61*a* is provided below the carry-out port 33*a* of the bucket elevator 33, and is a mesh-like plate material for removing foreign matter from the group of powder particles. The size of the mesh (through hole) of the grate 61*a* is a size through which the shot media can pass. The gate 61*b* is a member for adjusting the flow rate of the group of powder particles. The gate 61*b* is provided below the grate 61*a*, and is inclined so as to narrow the supply path of the group of powder particles toward the lower end of the gate 61*b*.

The deflection plate 61*c* is a member for uniformizing the flow of the group of powder particles. The deflection plate 61*c* is located downstream of the gate 61*b* in the supply path. The deflection plate 61*c* narrows the supply path of the group of powder particles in a state where the group of powder particles is not supplied, and widens the supply path of the group of powder particles in a state where the group of powder particles is supplied. The dispersion steel plate 61*d* blocks the group of powder particles that has passed through the grate 61*a*, the gate 61*b*, and the deflection plate 61*c* in this order to reduce the falling speed of the group of powder particles, and then supplies the group of powder particles to the sorting portion 62.

The sorting portion 62 is a portion that sorts the group of powder particles by the airflow F based on a difference in mass. The sorting portion 62 includes a vessel 62*a*, a pipe portion 62*b*, and a dispersion rod 62*c*. The vessel 62*a* is provided above the shot media tank 21, and is a cylindrical member whose upper and lower ends are open. The vessel 62*a* has a tapered shape whose diameter is reduced downward. The vessel 62*a* communicates with the inlet 41*a* provided below the vessel 62*a*. The pipe portion 62*b* is a tubular member extending in the up-down direction. A lower end of the pipe portion 62*b* is connected to an upper end of the vessel 62*a*. The dispersion rod 62*c* is provided in the pipe portion 62*b* and is a member that reduces the falling speed of the group of powder particles.

The connection pipe 63 couples the sorting portion 62 and the chamber 64. One end of the connection pipe 63 is provided above the upper end of the pipe portion 62*b*, and the other end of the connection pipe 63 extends from the upper wall of the chamber 64 into the chamber 64. In the chamber 64, the group of powder particles contained in the airflow F flowing in the chamber 64 through the connection pipe 63 is further sorted. A discharge port 64*a* is provided in the bottom portion of the chamber 64. The outlet 41*b* is provided in an upper portion of the chamber 64.

When the dust collector 44 operates, outside air is sucked from the inlet 41*a*, and inside the sorting mechanism 41, airflow F is generated that passes through the inlet 41*a*, the vessel 62*a*, the pipe portion 62*b*, the connection pipe 63, and the chamber 64 in this order, and flows out from the outlet 41*b* to the conduit 42. In this state, when the group of powder particles supplied from the supply portion 61 falls from the upper end of the pipe portion 62*b*, an upward force acts on the group of powder particles by the airflow F. At this time, the powder particles (for example, reusable shot media) having a heavy mass fall downward against the airflow F and are supplied to the shot media tank 21 through the vessel 62*a*.

On the other hand, the powder particles having a light mass rise with the airflow F and are conveyed to the chamber 64 through the connection pipe 63. The airflow F descends at the inlet of the chamber 64, and the wind speed of the airflow F decreases in the chamber 64 that is wider than the connection pipe 63. For this reason, in the group of powder particles conveyed to the chamber 64, powder particles (for example, sand) having a relatively heavy mass are separated from the airflow F and discharged from the discharge port 64*a*. Then, the remaining dust having a light mass passes through the conduit 42 from the outlet 41*b* together with the airflow F to be collected by the dust collector 44.

Figure 3:
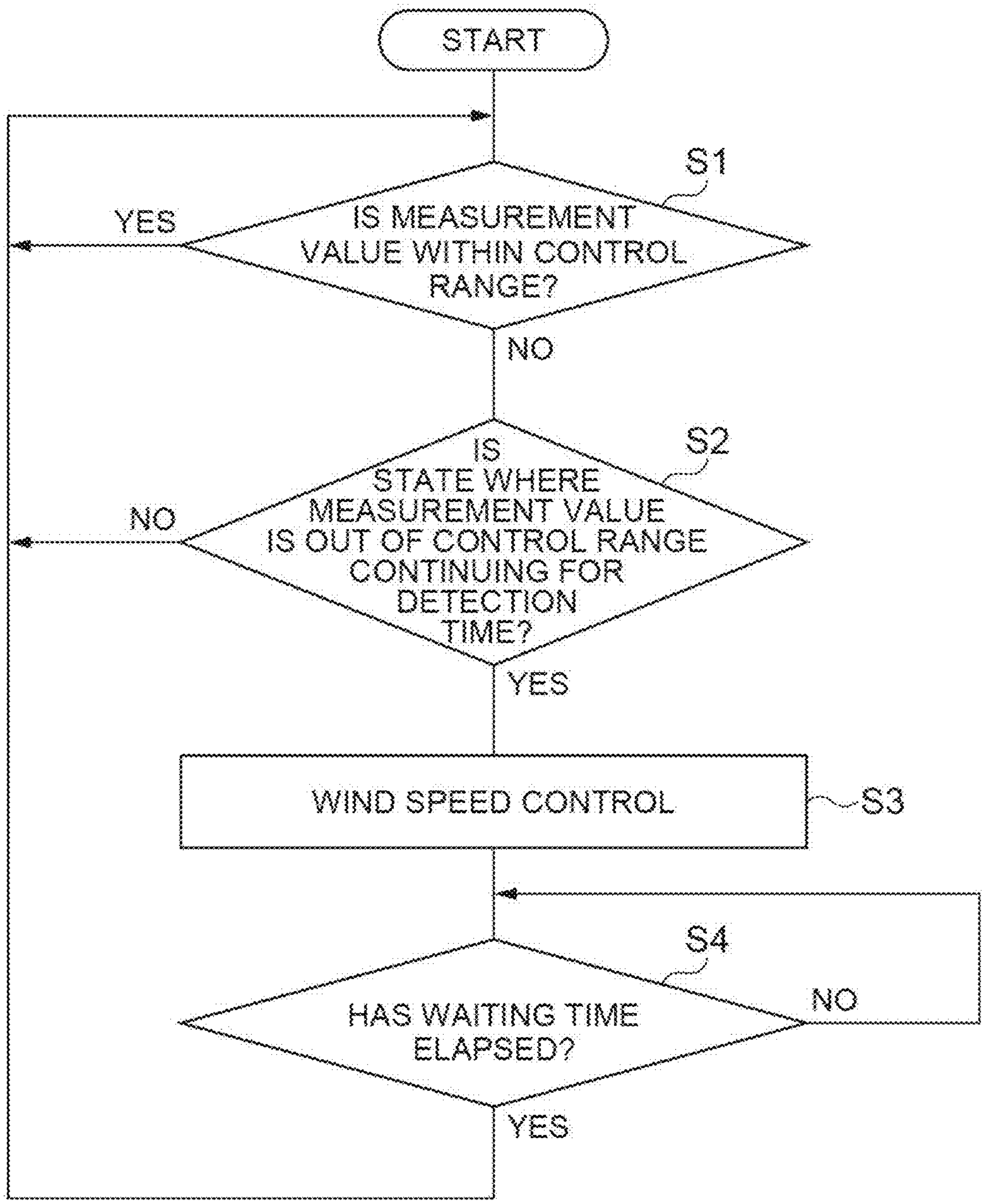
FIG. 3 is a flowchart showing an example of a wind speed control method performed by the control device shown in FIG. 1.
Figure 4:
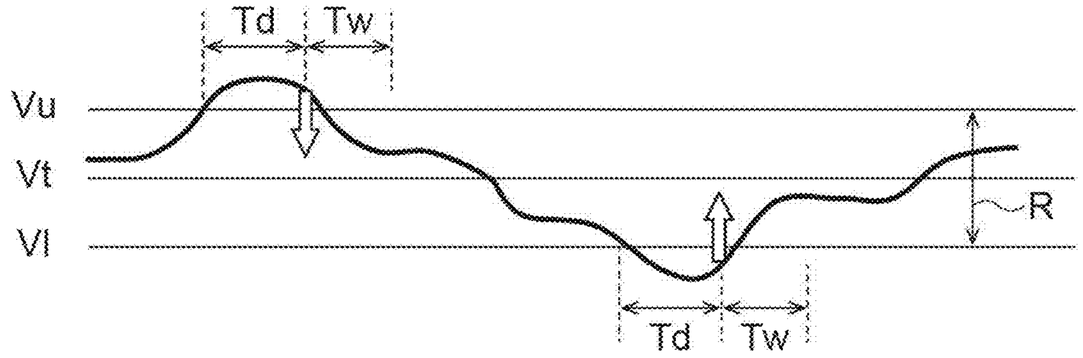
FIG. 4 is a diagram for explaining the wind speed control method shown in FIG. 3.

Next, an example of a wind speed control method performed by the control device 46 will be described with reference to FIGS. 3 and 4. FIG. 3 is a flowchart showing an example of a wind speed control method performed by the control device shown in FIG. 1. FIG. 4 is a diagram for explaining the wind speed control method shown in FIG. 3. A series of processes of the wind speed control method shown in FIG. 3 is started, for example, in response to the start of the operation of the dust collector 44. The measuring instrument 45 periodically transmits the measurement value to the control device 46.

As shown in FIG. 3, first, upon receiving the measurement value from the measuring instrument 45, the control device 46 determines whether or not the measurement value is within the control range R (step S1). As shown in FIG. 4, the control range R is a range of measurement values (here, measurement values of the wind speed of the outside air flowing into the sorting mechanism 41 through the inlet 41*a*) in which the airflow F that enables the sorting mechanism 41 to appropriately perform the sort can be obtained. The control range R is a range between an upper limit value Vu and a lower limit value Vl. In the present embodiment, the control range R includes a target value Vt. The upper limit value Vu is a value obtained by adding a predetermined value to the target value Vt, and the lower limit value Vl is a value obtained by subtracting the predetermined value from the target value Vt. That is, in the present embodiment, the difference between the upper limit value Vu and the target value Vt is the same as the difference between the target value Vt and the lower limit value Vl. The difference between the upper limit value Vu and the target value Vt may be different from the difference between the target value Vt and the lower limit value Vl.

For example, when the measurement value is equal to or less than the upper limit value Vu of the control range R and is equal to or greater than the lower limit value Vl of the control range R, the control device 46 determines that the measurement value is within the control range R. For example, when the measurement value is greater than the upper limit value Vu or the measurement value is less than the lower limit value Vl, the control device 46 determines that the measurement value is out of the control range R. When it is determined in step S1 that the measurement value is within the control range R (step S1: YES), the control device 46 performs step S1 again using the next measurement value.

On the other hand, when it is determined in step S1 that the measurement value is out of the control range R (step S1: NO), the control device 46 determines whether or not the state (abnormal state) is continuing for a detection time Td (step S2). For example, in a case where all of the measurement values measured by the measuring instrument 45 until the detection time Td elapses from the time at which it is determined in step S1 that the measurement value is greater than the upper limit value Vu are greater than the upper limit value Vu, the control device 46 determines that the abnormal state is continuing for the detection time Td. In a case where any one of the measurement values measured by the measuring instrument 45 until the detection time Td elapses from the time at which it is determined in step S1 that the measurement value is greater than the upper limit value Vu becomes equal to or less than the upper limit value Vu, the control device 46 determines that the abnormal state has not continued for the detection time Td.

Similarly, in a case where all of the measurement values measured by the measuring instrument 45 until the detection time Td elapses from the time at which it is determined in step S1 that the measurement value is less than the lower limit value Vl are less than the lower limit value Vl, the control device 46 determines that the abnormal state is continuing for the detection time Td. In a case where any one of the measurement values measured by the measuring instrument 45 until the detection time Td elapses from the time at which it is determined in step S1 that the measurement value is less than the lower limit value Vl becomes equal to or greater than the lower limit value Vl, the control device 46 determines that the abnormal state has not continued for the detection time Td. When it is determined in step S2 that the abnormal condition has not continued for the detection time Td (step S2: NO), the control device 46 performs step S1 again using the next measurement value.

On the other hand, when it is determined in step S2 that the abnormal state is continuing for the detection time Td (step S2: YES), the control device 46 performs the wind speed control (step S3). In step S3, the control device 46 performs the wind speed control so that the measurement value is maintained within the control range R. Specifically, the control device 46 performs the wind speed control by controlling the inverter that drives the fan motor 53 to change the rotation speed of the fan motor 53. For example, when the measurement value is greater than the upper limit value Vu, the control device 46 reduces the driving frequency of the inverter by a predetermined frequency to reduce the rotation speed of the fan motor 53. When the measurement value is less than the lower limit value Vl, the control device 46 increases the driving frequency of the inverter by a predetermined frequency to increase the rotation speed of the fan motor 53. The increase amount and the reduction amount of the driving frequency may be the same or different.

Subsequently, the control device 46 determines whether or not the waiting time Tw has elapsed from the time at which the wind speed control in step S3 ends (step S4). When it is determined that the waiting time Tw has not elapsed (step S4: NO), the control device 46 repeats the determination of step S4 until the waiting time Tw elapses. On the other hand, when it is determined that the waiting time Tw has elapsed (step S4: YES), the control device 46 performs step S1 again using the next measurement value. That is, the control device 46 stops the wind speed control until the waiting time Tw elapses from the time at which the wind speed control ends. Thereafter, steps S1 to S4 are repeated. It should be noted that the above-described wind speed control method may be continuously performed during the shot processing (that is, while the shot processing device 1 is operating). Alternatively, the above-described wind speed control method may be performed at a predetermined timing, in which case steps S1 to S4 may not be repeated. Examples of the above-mentioned timing include a timing when the shot processing device 1 is started and a predetermined timing during the operation of the shot processing device 1.

Figure 5:
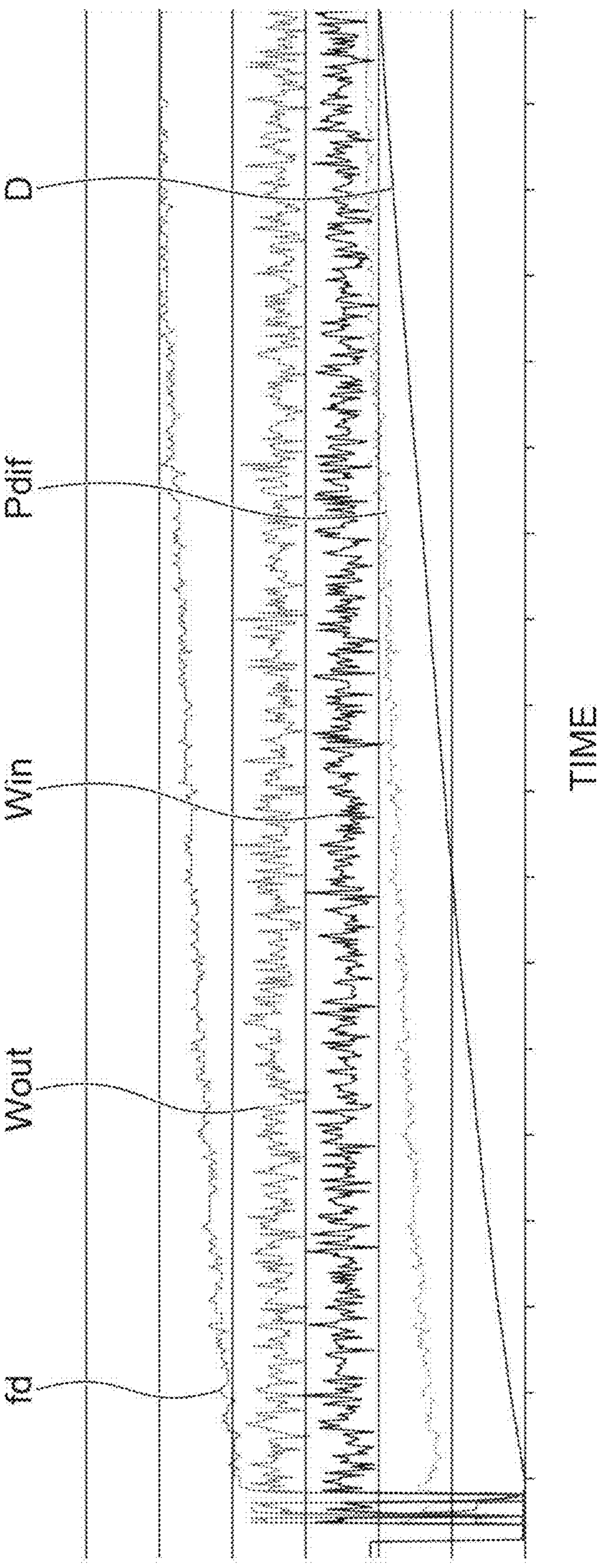
FIG. 5 is a diagram showing test results in a shot processing device of an example.
Figure 6:
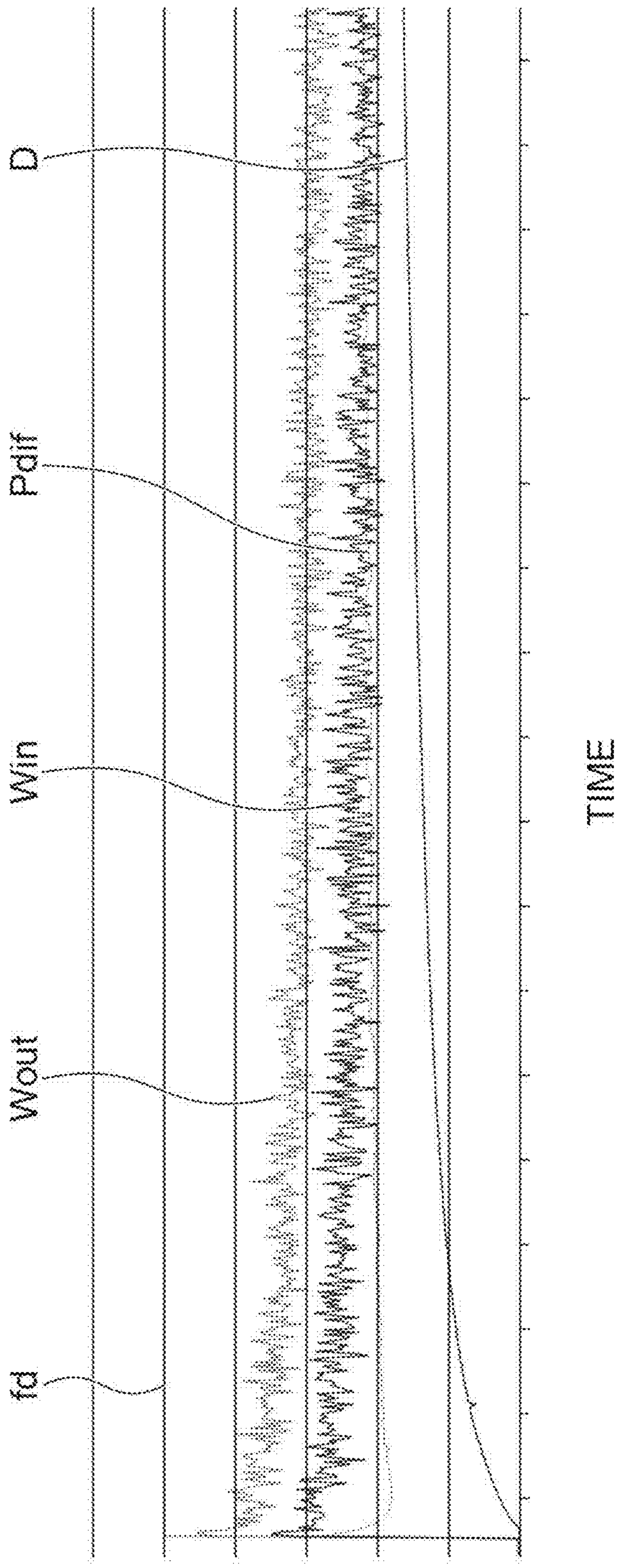
FIG. 6 is a diagram showing test results in a shot processing device of a comparative example.

Hereinafter, the content of the present disclosure will be described in detail using an example and a comparative example with reference to FIGS. 5 and 6, but the present disclosure is not limited to the following example. FIG. 5 is a diagram showing test results in a shot processing device of the example. FIG. 6 is a diagram showing test results in a shot processing device of the comparative example. The horizontal axes in FIGS. 5 and 6 indicate the time elapsed from the start of operation of the shot processing device. FIGS. 5 and 6 show temporal changes of a driving frequency fd of the inverter that drives the fan motor, a wind speed Win of the outside air flowing into the sorting mechanism from the inlet, a wind speed Wout of the clean air exhausted to the outside of the dust collector from the exhaust port, a differential pressure Pdif of the filter of the dust collector, and an integrated value D of the discharge amount of dust discharged from the dust collector.

In the example and the comparative example, the shot processing device 1 (shot blasting machine) shown in FIG. 1 was used. One impeller of 15 kW was used as the impeller 23, and the vertical facing airflow type separator shown in FIG. 2 was used as the sorting mechanism 41. In the example, the wind speed control method shown in FIG. 3 was performed, and in the comparative example, the wind speed control method was not performed. The target value Vt was set to 5 m/sec.

As shown in FIG. 6, in the comparative example, the driving frequency fd is constant, and the wind speed Win and the wind speed Wout gradually decrease as time passes from the start of operation of the shot blasting machine. For this reason, the increase rate of the integrated value D of the discharge amount of the dust is large at the start of the operation of the shot blasting machine, but gradually decreases as time passes. This indicates that the classification ability of the classification device declines with time.

On the other hand, as shown in FIG. 5, in the example, the driving frequency fd varies by performing the wind speed control method. As a result, the wind speed Win and the wind speed Wout are stable within a substantially constant range even when time passes from the start of operation of the shot blasting machine. For this reason, the increase rate of the integrated value D of the discharge amount of dust is substantially constant even if time passes. This indicates that the classification ability of the classification device is stable.

In the classification device 40 described above, the group of powder particles is sorted using the airflow F generated by the dust collector 44, and the wind speed control is performed so that the measurement value of the wind speed of the outside air flowing into the sorting mechanism 41 through the inlet 41*a* is maintained within the control range R. Since the fluctuation of the speed (wind speed) of the airflow F in the sorting mechanism 41 is suppressed by the measurement value being maintained within the control range R, it is possible to suppress reductions in the classification accuracy. By using the airflow F generated by the dust collector 44 to sort the group of powder particles, the sorting can be performed simultaneously with the dust collection.

In the classification device 40, the control device 46 performs the wind speed control by changing the rotation speed of the fan motor 53. When the rotation speed of the fan motor 53 increases, the wind speed of the airflow F in the sorting mechanism 41 increases, and when the rotation speed of the fan motor 53 decreases, the wind speed of the airflow F in the sorting mechanism 41 decreases. Therefore, the wind speed control can be realized by changing the rotation speed of the fan motor 53.

Since the powder particles are mixed in the airflow F in the sorting mechanism 41, if the measuring instrument 45 is provided inside the sorting mechanism 41, there is a concern that the measuring instrument 45 may be broken by the powder particles. On the other hand, in the classification device 40, the measuring instrument 45 is provided in the inlet 41*a* and measures the wind speed of the outside air flowing into the sorting mechanism 41 from the inlet 41*a*. Since no powder particle is contained in the outside air, it is possible to prevent the measuring instrument 45 from being broken by the powder particles.

Since the wind speed of the airflow F is likely to fluctuate, the measurement value may temporarily fall out of the control range R. In such a case, if the wind speed control is performed, the wind speed control is frequently performed, and the measurement value may not be stably maintained within the control range R. On the other hand, in the classification device 40, the control device 46 performs the wind speed control in response to the state in which the measurement value is out of the control range R continuing for the detection time Td. In this configuration, since the wind speed control is performed when the measurement value is continuously out of the control range R, it is possible to avoid a situation in which the wind speed control is frequently performed, and to stably maintain the measurement value within the control range R. As a result, it is possible to further suppress reductions in classification accuracy.

It takes a certain amount of time until the wind speed of the airflow F becomes stable after the wind speed control is performed. Therefore, immediately after the wind speed control is performed, the measurement value may still remain outside the control range R. In such a case, if the wind speed control is performed, the wind speed control is frequently performed, and the measurement value may not be stably maintained within the control range R. On the other hand, in the classification device 40, the control device 46 stops the wind speed control until the waiting time Tw elapses from the time at which the wind speed control ends. In this configuration, since the wind speed control can be stopped until the wind speed of the airflow F becomes stable from the time at which the wind speed control ends, it is possible to avoid a situation in which the wind speed control is frequently performed, and to stably maintain the measurement value within the control range R. As a result, it is possible to further suppress reductions in classification accuracy.

In the shot processing device 1, the shot processing is performed by projecting shot media onto a workpiece, a group of powder particles generated by the shot processing is supplied to the classification device 40, and reusable shot media are sorted from the group of powder particles and are supplied to the projection device 20. In the shot processing, by using shot media having a particle size distribution suitable for processing, the efficiency of the shot processing can be improved. When the shot media are repeatedly used, cracking, chipping, wear, and the like may occur in the shot media. In the shot processing device 1, since the classification device 40 capable of suppressing reductions in classification accuracy is used, it is possible to accurately exclude the shot media which do not contribute to the shot processing from the group of powder particles. Therefore, the shot media having an appropriate particle size distribution can be continuously supplied to the projection device 20. As a result, the efficiency of the shot processing can be improved. By using shot media having an appropriate particle size distribution, a plurality of workpieces can be processed with the same quality.

The classification device and the shot processing device according to the present disclosure are not limited to the above-described embodiments.

For example, in the sand removal, since the attached sand is removed from the cast in the initial stage of the treatment, a large amount of the attached sand is mixed into the powder particles generated by the shot processing. Since the surface of the cast is mainly polished, ground and cleaned in the middle stage of the treatment or later, the amount of the attached sand mixed into the powder particles is reduced, and the cutting powder of the surface and the broken pieces of the shot may be mixed into the powder particles. If the same control range R is used in these processes, there is a possibility that the shot media are used cyclically in the initial stage with the attached sand insufficiently removed, and that the reusable shot media are discarded in the middle stage or later. Therefore, the control range R may be set (changed) according to the purpose for each process of the shot processing. The operator may set and change the control range R, or the control range R set in advance for each process may be switched. For example, when a small amount of dust is generated, the operation power of the dust collector 44 can be suppressed, and the power consumption can be reduced.

Figure 7:
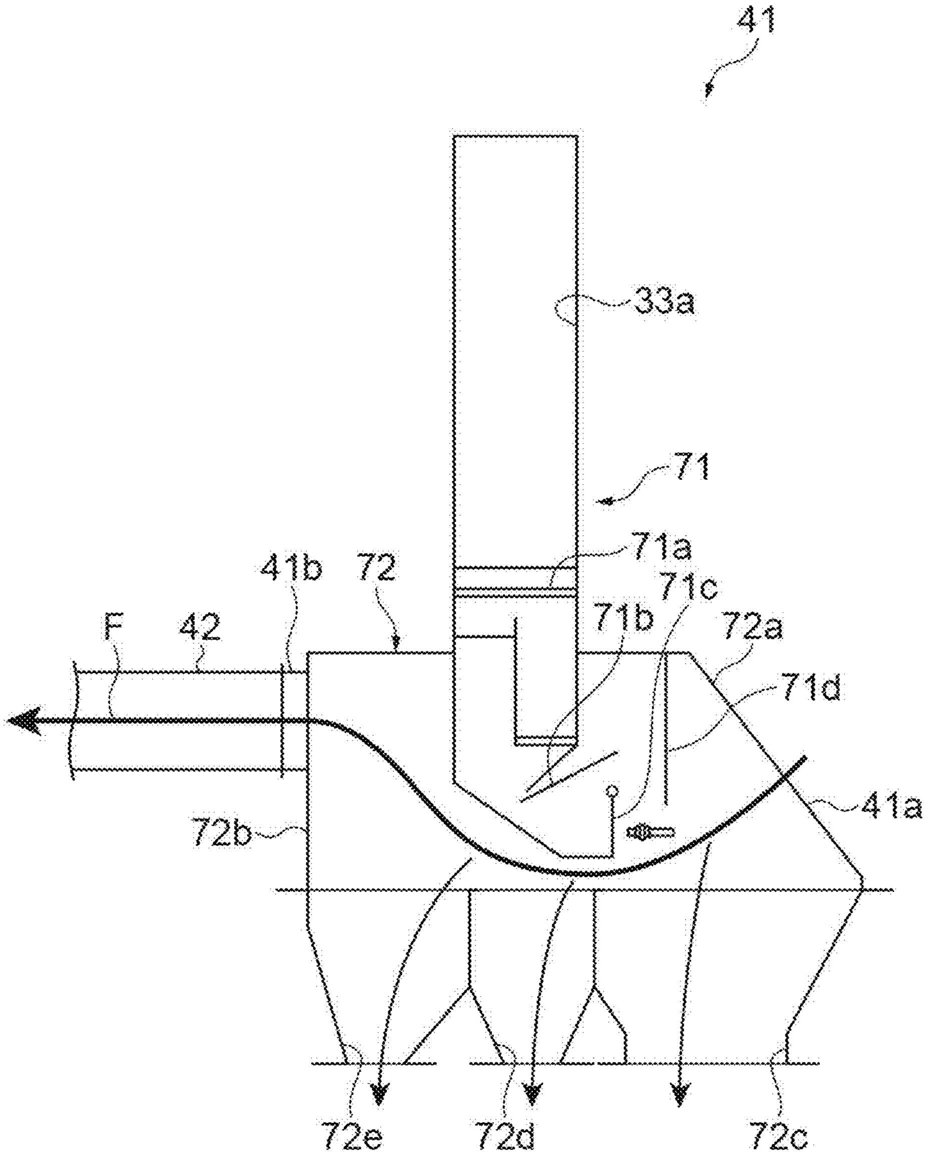
FIG. 7 is a diagram schematically showing another example of the sorting mechanism shown in FIG. 1.

In the above embodiments, the sorting mechanism 41 is a vertical facing airflow type separator, but the sorting mechanism 41 may be another separator. Another example of the sorting mechanism 41 will be described with reference to FIG. 7. FIG. 7 is a diagram schematically showing another example of the sorting mechanism shown in FIG. 1. The sorting mechanism 41 shown in FIG. 7 is a horizontal right-angle airflow type separator, and includes a supply portion 71 and a chamber 72.

The supply portion 71 is a portion that defines a supply path for supplying the group of powder particles supplied from the bucket elevator 33 to the chamber 72. A part of the supply portion 71 is provided inside the chamber 72. The supply portion 71 includes a grate 71*a*, a gate 71*b*, a deflection plate 71*c*, and an anti-scattering sheet 71*d*.

The grate 71*a* is provided below the carry-out port 33*a* of the bucket elevator 33, and is a mesh-like plate material for removing foreign matter from the group of powder particles. The size of the mesh (through hole) of the grate 71*a* is a size through which the shot media can pass. The gate 71*b* is a member for adjusting the flow rate of the group of powder particles. The gate 71*b* is provided inside the chamber 72 and is located below the grate 71*a*. The gate 71*b* is inclined so as to narrow the supply path of the group of powder particles toward the lower end of the gate 71*b*.

The deflection plate 71*c* is a member for uniformizing the flow of the group of powder particles. The deflection plate 71*c* is provided inside the chamber 72 and is located downstream of the gate 71*b* in the supply path. The deflection plate 71*c* narrows the supply path of the group of powder particles in a state where the group of powder particles is not supplied, and widens the supply path of the group of powder particles in a state where the group of powder particles is supplied. The anti-scattering sheet 71*d* is provided inside the chamber 72 and hangs down from the upper wall of the chamber 72. The anti-scattering sheet 71*d* is a member for preventing scatter of the group of powder particles that has passed through the grate 71*a*, the gate 71*b*, and the deflection plate 71*c* in order.

The chamber 72 has a side wall 72*a* and a side wall 72*b* horizontally facing each other in an upper portion of the chamber 72. Between the side wall 72*a* and the side wall 72*b*, the supply portion 71 extends from the upper wall of the chamber 72 toward the bottom portion of the chamber 72. The side wall 72*a* is inclined so as to expand the internal space of the chamber 72 toward the lower end of the side wall 72*a*. The inlet 41*a* is provided in the side wall 72*a*. The outlet 41*b* is provided in the side wall 72*b*. In the bottom portion of the chamber 72, discharge ports 72*c*, 72*d*, and 72*e* are provided in this order from the side wall 72*a* toward the side wall 72*b*.

When the dust collector 44 operates, outside air is sucked from the inlet 41*a*, and an airflow F is generated from the inlet 41*a* toward the outlet 41*b* inside the chamber 72. The flow path of the airflow F is curved downward so as to avoid the supply portion 71. In this state, when the group of powder particles is supplied from the supply portion 71, a force in a substantially horizontal direction acts on the group of powder particles by the airflow F. At this time, the powder particles (for example, reusable shot media) having a heavy mass fall in the vicinity of the inlet 41*a* and are supplied to the shot media tank 21 through the discharge port 72*c*. The powder particles having a light mass are carried toward the outlet 41*b* by the airflow F.

When the airflow F passes below the supply portion 71, the airflow F moves upward toward the outlet 41*b*. At this time, a part (a mixture of the shot media and the fine powder) having a relatively heavy mass of the group of powder particles carried by the airflow F is separated from the airflow F, discharged from the discharge port 72*d*, and supplied to an overflow tank (not shown). The group of powder particles supplied to the overflow tank is supplied again to the sorting mechanism 41. Further, a part (fine powder) having a relatively heavy mass of the remaining group of powder particles is separated from the airflow F and discharged from the discharge port 72*e*. On the other hand, the remaining dust having a light mass passes through the conduit 42 from the outlet 41*b* together with the airflow F to be collected by the dust collector 44.

The measuring instrument 45 may measure a measurement value of physical quantity in which a change in the wind speed of the airflow F is reflected, and the location of the measuring instrument 45 and the type of the measuring instrument 45 may be changed as appropriate. The control range R is appropriately set depending on the type of physical quantity to be measured. For example, the measuring instrument 45 may be provided in the exhaust port 51*b*. Specifically, the measuring instrument 45 may be provided outside the dust collector 44 and measure the wind speed of the clean air exhausted from the exhaust port 51*b*. In this case, the wind speed control is performed so that the measurement value of the wind speed of the clean air is maintained within the predetermined control range R. Not only the airflow from the sorting mechanism 41 but also the airflow from the cabinet 10 flows into the dust collector 44. For this reason, although the wind speed of the clean air exhausted from the exhaust port 51*b* becomes higher than the wind speed of the airflow F in the sorting mechanism 41, the wind speed of the airflow F in the sorting mechanism 41 is reflected in the wind speed of the clean air. Therefore, since the fluctuation of the speed (wind speed) of the airflow F in the sorting mechanism 41 is suppressed by the measurement value being maintained within the control range R, it is possible to suppress reductions in the classification accuracy. Further, in the dust collector 44, clean air from which powder particles (powder dust) have been removed is exhausted from the exhaust port 51*b*. Therefore, since no powder particle is contained in the clean air, it is possible to avoid the failure of the measuring instrument 45 due to the powder particles.

The measuring instrument 45 may be provided in both the inlet 41*a* and the exhaust port 51*b*. The control device 46 may perform the wind speed control so that each measurement value is maintained within each control range R.

In the above-described embodiments, the control device 46 is a control device dedicated to the wind speed control. However, the control device 46 may integrally control the shot processing device 1.

The control device 46 may perform the wind speed control in a stepwise manner over a predetermined operation time. In this case, since the wind speed of the airflow F in the sorting mechanism 41 gradually changes, it is possible to suppress the turbulence of the airflow F. As a result, it is possible to further suppress reductions in classification accuracy.

Figure 8:
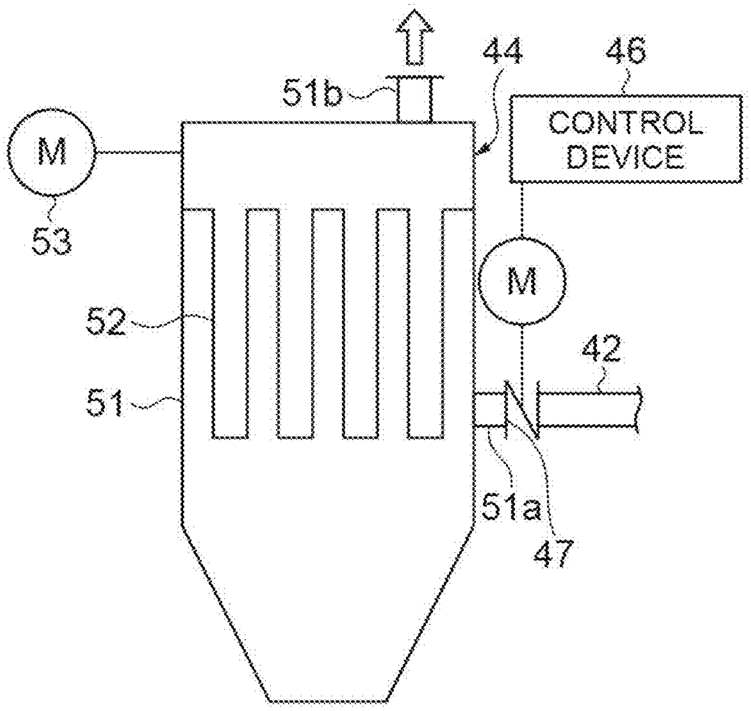
FIG. 8 is a diagram showing another configuration example for realizing wind speed control.

In the above-described embodiments, the control device 46 performs the wind speed control by changing the rotation speed of the fan motor 53. However, a method of realizing the wind speed control is not limited thereto. Another method of realizing the wind speed control will be described with reference to FIG. 8. FIG. 8 is a diagram showing another configuration example for realizing wind speed control. In the configuration example shown in FIG. 8, the classification device 40 further includes a damper 47 (flow rate adjuster). The damper 47 is a device for adjusting the suction force of the dust collector 44. The damper 47 is provided in a flow path (conduit 42) between the sorting mechanism 41 and the dust collector 44. The damper 47 is configured to be capable of adjusting an opening degree.

In the configuration example shown in FIG. 8, the control device 46 performs the wind speed control by changing the opening degree of the damper 47. The flow rate of the airflow from the sorting mechanism 41 toward the dust collector 44 is adjusted by the opening degree of the damper 47. For example, when the opening degree of the damper 47 increases, the flow rate of the airflow from the sorting mechanism 41 toward the dust collector 44 increases, and thus the wind speed of the airflow F increases. When the opening degree of the damper 47 becomes small, the flow rate of the airflow from the sorting mechanism 41 toward the dust collector 44 decreases, and thus the wind speed of the airflow F decreases. Therefore, the wind speed control can be realized by changing the opening degree of the damper 47.

The control device 46 may perform wind speed control by changing both the rotation speed of the fan motor 53 and the opening degree of the damper 47. For example, the control device 46 may first change the rotation speed of the fan motor 53 and then change the opening degree of the damper 47 in response to the rotation speed of the fan motor 53 reaching the upper limit value or the lower limit value.

What is claimed is:

1. A classification device comprising:

a sorter configured to sort a group of powder particles using an airflow;

a duster configured to generate the airflow;

a sensor configured to measure a measurement value related to a speed of the airflow; and a controller configured to perform wind speed control that controls the speed of the airflow so that the measurement value is maintained within a control range, wherein the controller determines whether or not an abnormal state, in which a plurality of measurement values measured by the sensor are out of the control range, is continuously maintained over a detection time period, and performs the wind speed control in response to it being determined that the abnormal state is continuously maintained over the detection time period, and wherein the controller measures an elapsed time that elapses from a time at which the wind speed control ends, and maintains stopping of the wind speed control until the elapsed time reaches a waiting time from the time at which the wind speed control ends.

2. The classification device according to claim 1, wherein the duster comprises a fan motor capable of adjusting a flow rate of the airflow, and wherein the controller performs the wind speed control by changing a rotation speed of the fan motor.

3. The classification device according to claim 2, further comprising:

a conduit that is provided between the sorter and the duster and through which the airflow passes; and a flow rate adjuster that is provided in the conduit and is capable of adjusting an opening degree, wherein the controller performs the wind speed control by changing the opening degree.

4. The classification device according to claim 3, further comprising an inlet through which outside air is introduced into the sorter, wherein the sensor is provided in the inlet.

5. The classification device according to claim 4, wherein the duster comprises an exhaust port through which clean air is exhausted to outside of the classification device, and wherein the sensor is provided in the exhaust port.

6. The classification device according to claim 3, wherein the duster comprises an exhaust port through which clean air is exhausted to outside of the classification device, and wherein the sensor is provided in the exhaust port.

7. The classification device according to claim 2, further comprising an inlet through which outside air is introduced into the sorter, wherein the sensor is provided in the inlet.

8. The classification device according to claim 7, wherein the duster comprises an exhaust port through which clean air is exhausted to outside of the classification device, and wherein the sensor is provided in the exhaust port.

9. The classification device according to claim 2, wherein the duster comprises an exhaust port through which clean air is exhausted to outside of the classification device, and wherein the sensor is provided in the exhaust port.

10. The classification device according to claim 1, further comprising:

a conduit that is provided between the sorter and the duster and through which the airflow passes; and a flow rate adjuster that is provided in the conduit and is capable of adjusting an opening degree, wherein the controller performs the wind speed control by changing the opening degree.

11. The classification device according to claim 10, further comprising an inlet through which outside air is introduced into the sorter, wherein the sensor is provided in the inlet.

12. The classification device according to claim 11, wherein the duster comprises an exhaust port through which clean air is exhausted to outside of the classification device, and wherein the sensor is provided in the exhaust port.

13. The classification device according to claim 10, wherein the duster comprises an exhaust port through which clean air is exhausted to outside of the classification device, and wherein the sensor is provided in the exhaust port.

14. The classification device according to claim 1, further comprising an inlet through which outside air is introduced into the sorter, wherein the sensor is provided in the inlet.

15. The classification device according to claim 14, wherein the duster comprises an exhaust port through which clean air is exhausted to outside of the classification device, and wherein the sensor is provided in the exhaust port.

16. The classification device according to claim 1, wherein the duster comprises an exhaust port through which clean air is exhausted to outside of the classification device, and wherein the sensor is provided in the exhaust port.

17. The classification device according to claim 1, wherein the controller performs the wind speed control in a stepwise manner over an operation time.

18. A shot processing device comprising:

the classification device according to claim 1;

a shot media projector configured to perform shot processing by projecting shot media onto a workpiece; and a collector configured to collect a group of powder particles generated by the shot processing and to supply the group of powder particles to the classification device, wherein the classification device sorts reusable shot media from the group of powder particles and supplies the shot media to the shot media projector, and wherein the controller performs the wind speed control to suppress a reduction in accuracy of sorting the reusable shot media.

19. The shot processing device according to claim 18, wherein the controller reduces a rotation speed of a fan motor of the duster when all of measurement values measured by the sensor during the detection time period are greater than an upper limit value of the control range, and wherein the controller increases the rotation speed of the fan motor when all of measurement values measured by the sensor during the detection time period are less than a lower limit value of the control range.

20. The shot processing device according to claim 19, wherein the classification device further comprises a damper provided in a flow path between the sorter and the duster and configured to be capable of adjusting an opening degree, and wherein the controller performs the wind speed control by changing both the rotation speed of the fan motor and the opening degree of the damper.

* * * * *